United States Patent Office 3,072,702
Patented Jan. 8, 1963

3,072,702
PHOSPHORUS AND SULFUR CONTAINING ORGANIC COMPOUNDS
Herman O. Senkbeil, Midland, Mich., assignor to The Dow Chemical Company, Midland, Mich., a corporation of Delaware
No Drawing. Filed Sept. 2, 1958, Ser. No. 758,604
12 Claims. (Cl. 260—461)

The present invention relates to organic compounds containing both sulphur and phosphorus and is more particularly concerned with phosphoramidodithioates and their preparation.

The compounds of this invention have the general formula:

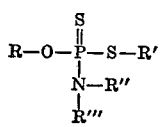

(Formula I)

wherein R is a lower alkyl radical containing up to 4 carbon atoms, R' is an alkyl radical containing up to 12 carbon atoms, a benzyl radical or a hydroxyalkyl radical containing from 2 to 8 carbon atoms, and R" and R'" are hydrogen or a lower alkyl radical containing up to 4 carbon atoms. These compounds have exhibited utility as parasiticides and have been used to control such insect pests as house flies, Mexican bean bettles, southern army worms, American roaches, bean aphids and two-spotted spider mites.

Preparation of the O-alkyl S-substituted phosphoramidodithioates of the present invention is readily accomplished by contacting an alkali metal mercaptide with an O-alkyl phosphoramidohalidothioate in the presence of solvent which is essentially inert to the reactants and reaction products. An alkali metal halide is precipitated during the reaction and upon completion of the reaction, the precipitate may be removed by filtration. The solvent used in the reaction is removed by distillation and the remaining reaction mixture is fractionally distilled under reduced pressure to separate and purify the desired O-alkyl S-substituted phosphoramidodithioate. The reaction taking place may be represented by the following equation:

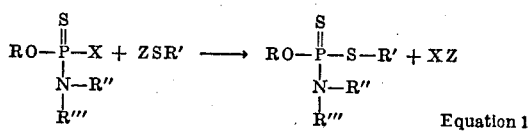

(Formula II)

wherein R, R', R", and R'" are the same as defined in Formula I, X is a halogen having an atomic number between 8 and 54, an Z is an alkali metal. Representative alkali metals which are suitable have an atomic number from 10 to 20, for example sodium and potassium, and the halogen may be fluorine, chlorine, bromine or iodine. A suitable solvent for the reaction is benzene, however, toluene, xylene, petroleum ether boiling in the range of 60–180° C. at standard temperature and pressure, etc., also may be used. A preferred solvent will have a boiling point below 100° C. The reaction should be carried out at a temperature below 50° C. otherwise the yield of the desired O-alkyl S-substituted phosphoramidodithioate may be reduced and undesirable side reaction may take place. A preferred temperature range is 5 to 35° C. and a desirable temperature range is 10 to 25° C. Preferably a benzene or toluene solution of the alkali metal mercaptide is prepared, then the desired O-alkyl phosphoramidochloridothioate is added slowly in 0–50 percent molar excess to the alkali metal mercaptide solution, while maintaining agitation of the reaction mixture during the addition and preferably for a period of one to two hours hereafter. The precipitated alkali metal halide formed during the reaction is then removed by filtration, the solvent removed by distillation under reduced pressures in the range of 20 to 200 millimeters of mercury absolute at temperatures of less than 70° C. The use of temperatures below 70° C. minimizes the possibility of thermal degradation of the product. Fractional distillation of the reaction product at pressures of 1 millimeter of mercury absolute or less will yield the desired O-alkyl S-substituted phosphoramidodithioate.

The O-alkyl S-substituted phosphoramidodithioates are free-flowing liquids, usually colorless, though some may have a slight yellowish color.

The following examples illustrate the invention, but are not to be construed as limiting.

Example I

O-Methyl S-Ethyl Methylphosphoramidodithioate $$\begin{array}{c} S \\ \| \\ CH_3-O-P-S-CH_2CH_3 \\ | \\ N-H \\ | \\ CH_3 \end{array}$$

A 500 milliliter round bottomed flask was fitted with an agitator, a condenser, a thermometer and a dropping funnel; 200 milliliters of dry benzene were added to the flask and 4.6 grams (0.2 mole) of metallic sodium dispersed in 4.6 grams of toluene were added to the benzene contained in the flask. Twelve and four-tenths (12.4) grams of ethyl mercaptan were added dropwise to the benzene diluted sodium dispersion. The reaction mixture was maintained at a temperature of 20° C. by applying an ice bath to the outside of the 500 milliliter flask to remove the heat generated by the reaction of the metallic sodium and the ethyl mercaptan. Thirty-five (35) grams (0.22 mole) of O-methyl methylphoramidochloridothioate were added over a period of 20–30 minutes to the reaction mixture contained in the 500 milliliter flask, while maintaining the reaction mixture at a temperature between 15 and 20° C. The reaction mixture was agitated and maintained at a temperature of 20–30° C. for a period of 2 hours after the addition of O-methyl methylphosphoramidochloridothioate had been completed. The reaction mixture was removed from the 500 milliliter flask and filtered. A solid weighing 28.5 grams was removed from the filtrate and discarded. The filtrate was placed under a reduced pressure of approximately 20 millimeters of mercury absolute and the benzene removed by distillation using pot temperatures up to 70° C. The remaining high boiling portion of the reaction mixture was fractionally distilled under a pressure of 0.08 millimeter of mercury absolute, resulting in a yield of 26.7 grams (72.3 percent of theoretical based on ethyl mercaptan) of O-methyl S-ethyl methylphosphoramidodithioate having a boiling range of 65.5 to 71.5° C. at a pressure of 0.08 millimeter of mercury absolute.

| Analysis | Percent Sulphur | Percent Nitrogen |
|---|---|---|
| Calculated | 34.6 | 7.56 |
| Found | 33.74 | 7.52 |

EXAMPLE II

*O-Methyl S-Butyl Methylphosphoramidothioate*

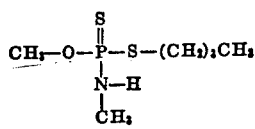

The procedure of Example I was repeated with the exception that eighteen (18) grams (0.2 mole) of butyl mercaptan was employed instead of ethyl mercaptan. There was thus obtained a 66 percent of the theoretical yield, based on butyl mercaptan, of O-methyl S-butyl methylphosphoramidodithioate, having a boiling range of 81–87° C. at a pressure of 0.07 millimeter of mercury absolute.

| Analysis | Percent Sulphur | Percent Nitrogen |
|---|---|---|
| Calculated | 30.0 | 6.57 |
| Found | 30.15 | 6.51 |

EXAMPLE III

*O-Methyl S-Propyl Methylphosphorodithioate*

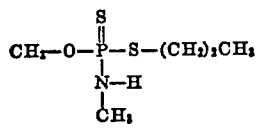

The procedure of Example I was repeated with the exception that fifteen and two-tenths (15.2) grams (0.2 mole) of propyl mercaptan was employed instead of ethyl mercaptan. There was thus obtained 50.7 percent of the theoretical yield, based on propyl mercaptan, of unpurified O-methyl S-propyl methylphosphoramidodithioate, having a boiling range of 77–84° C. at a pressure of 0.09 millimeter of mercury absolute.

| Analysis | Percent Sulphur | Percent Nitrogen |
|---|---|---|
| Calculated | 32.15 | 7.03 |
| Found | 30.00 | 7.02 |

EXAMPLE IV

*O-Methyl S-Tertiary-Butyl Methylphosphoramidodithioate*

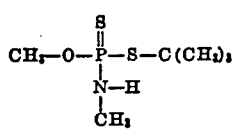

The procedure in Example I was repeated with the exception eighteen (18) grams (0.2 mole) of tertiary-butyl mercaptan was employed instead of ethyl mercaptan. There was thus obtained unpurified O-methyl S-tertiary-butyl methyl phosphoramidodithioate, having a boiling range of 78–99° C. at a pressure of 0.15 to 0.45 millimeter of mercury absolute.

| Analysis | Percent Sulphur | Percent Nitrogen |
|---|---|---|
| Calculated | 30.0 | 6.57 |
| Found | 32.13 | 6.72 |

EXAMPLE V

*O-Methyl S-Secondary-Butyl Methylphosphoramidodithioate*

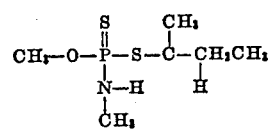

The procedure in Example I was repeated with the exception that eighteen (18) grams (0.2 mole) of secondary-butyl mercaptan was employed instead of ethyl mercaptan. There was thus obtained a 52.8 percent theoretical yield, based on secondary-butyl mercaptan, of unpurified O-methyl S-secondary butyl methylphosphoramidodithioate, having a boiling range of 78–99° C. at a pressure of 0.15–0.45 millimeter of mercury absolute.

| Analysis | Percent Sulphur | Percent Nitrogen |
|---|---|---|
| Calculated | 30.0 | 6.57 |
| Found | 29.51 | 6.65 |

EXAMPLE VI

*O-Methyl S-Benzyl Methylphosphoramidodithioate*

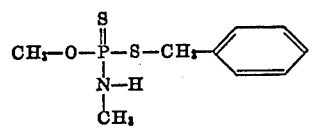

The procedure in Example I was repeated with the exception that twenty-four and nine-tenths (24.9) grams (0.2 mole) of benzyl mercaptan was employed instead of ethyl mercaptan. There was thus obtained a 61.8 percent of theoretical yield, based on benzyl mercaptan, of unpurified O-methyl S-benzyl methylphosphoramidodithioate.

| Analysis | Percent Sulphur | Percent Nitrogen |
|---|---|---|
| Calculated | 25.9 | 5.67 |
| Found | 25.70 | 5.56 |

EXAMPLE VII

*O-Methyl S-Octyl Methylphosphoramidodithioate*

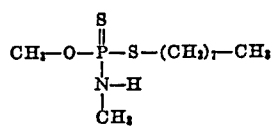

The procedure in Example I was repeated with the exception that twenty-nine and two-tenths (29.2) grams (0.2 mole) of octyl mercaptan was employed instead of ethyl mercaptan. There was thus obtained a 57.5 percent of theoretical yield, based on octyl mercaptan, of O-methyl S-octyl methylphosphoramidodithioate.

| Analysis | Percent Sulphur | Percent Nitrogen |
|---|---|---|
| Calculated | 23.8 | 5.2 |
| Found | 24.34 | 5.53 |

EXAMPLE VIII

O-Methyl S-(2-Hydroxyethyl) Methylphosphor- amidodithioate

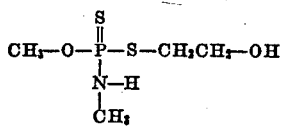

The procedure in Example I was repeated with the exception that fifteen and six-tenths (15.6) grams (0.2 mole) of 2-hydroxyethyl mercaptan was employed instead of ethyl mercaptan. There was thus obtained a 13.7 percent of theoretical yield, based on 2-hydroxyethyl mercaptan, of O-methyl S-(2-hydroxyethyl) methylphosphoramidodithioate, which was found to have the following solubility characteristics: less than 1 percent soluble in water and in kerosene, greater than 25 percent soluble in acetone, in 95 percent ethanol and in xylene.

EXAMPLE IX

O-Ethyl S-Propyl Methylphosphor- amidodithioate

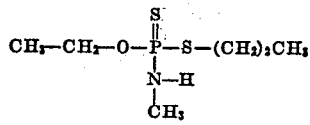

A 500 milliliter round bottomed flask was fitted with an agitator, a condenser, a thermometer and a dropping funnel; 200 milliliters of dry benzene were added to the flask and 4.6 grams (0.2 mole) of metallic sodium dispersed in 4.6 grams of toluene were added to the benzene. Fifteen and two-tenths (15.2) grams (0.2 mole) of propyl mercaptan were added dropwise to the benzene-diluted sodium dispersion. The reaction mixture was maintained at a temperature of 20° C. by applying an ice bath to the outside of the 500 milliliter flask to remove the heat generated by the reaction of the metallic sodium and the propyl mercaptan. Thirty-five (35) grams (0.22 mole) of O-ethyl methylphosphoramidochloridothioate were added, over a period of 20 to 30 minutes, to the reaction mixture contained in the 500 milliliter flask, while maintaining the reaction mixture at a temperature between 15 and 20° C. The reaction mixture was agitated and maintained at a temperature of 20–30° C. for a period of 2 hours after the addition of O-ethyl methyl- phosphoramidochloridothioate had been completed. The reaction mixture was removed from the 500 milliliter flask and filtered. The solid removed from the filtrate was discarded. The filtrate was placed under reduced pressure of approximately 20 millimeters of mercury absolute and the benzene removed by distillation using pot temperatures up to 70° C. The remaining high boiling portion of the reaction mixture was fractionally distilled under a pressure of 0.06 millimeter of mercury absolute, resulting in a yield of 61 percent of theoretical, based on propyl mercaptan, of unpurified O-ethyl S-propyl methyl- phosphoramidodithioate, having a boiling range of 96–103° C. at a pressure of 0.06 millimeter of mercury absolute.

| Analysis | Percent Sulphur | Percent Nitrogen |
|---|---|---|
| Calculated | 30.0 | 6.57 |
| Found | 26.7 | 6.97 |

EXAMPLE X

O-Ethyl S-Butyl Methylphosphor- amidodithioate

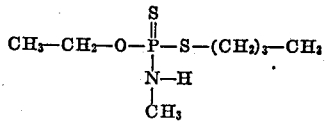

The method used in Example IX was repeated with the exception that eighteen (18) grams (0.2 mole) of butyl mercaptan was employed instead of propyl mercaptan. There was thus obtained a 49.5 percent of theoretical yield, based on ethyl mercaptan, of unpurified O-ethyl S-butyl methylphosphoramidodithioate, having a boiling range of 92–97° C. under a pressure of .08 millimeter of mercury absolute.

| Analysis | Percent Sulphur | Percent Phosphorus | Percent Nitrogen |
|---|---|---|---|
| Calculated | 28.2 | 13.65 | 6.16 |
| Found | 28.61 | 14.03 | 6.52 |

EXAMPLE XI

O-Ethyl S-Octyl Methylphosphor- amidothioate $$CH_3CH_2-O-\overset{\overset{S}{\|}}{\underset{\underset{CH_3}{N-H}}{P}}-S-(CH_2)_7-CH_3$$

The method in Example IX was repeated with the exception that twenty-nine and two-tenths (29.2) grams (0.2 mole) of octyl mercaptan was employed instead of propyl mercaptan. There thus was obtained unpurified O-ethyl S-octyl methylphosphoramidodithioate.

| Analysis | Percent Sulphur | Percent Nitrogen |
|---|---|---|
| Calculated | 22.6 | 4.95 |
| Found | 20.54 | 5.33 |

EXAMPLE XII

O-Methyl S-Propyl Dimethylphosphor- amidodithioate $$CH_3-O-\overset{\overset{S}{\|}}{\underset{\underset{}{N(CH_3)_2}}{P}}-S-(CH_2)_2CH_3$$

A 500 milliliter round bottomed flask was fitted with an agitator, a condenser, a thermometer and a dropping funnel, 200 milliliters of dry benzene were added to the flask and 4.6 grams (0.2 mole) of metallic sodium dispersed in 4.6 grams of toluene were added to the benzene. Fifteen and two-tenths (15.2) grams (0.2 mole) of propyl mercaptan were added dropwise to the benzene diluted sodium dispersion. The reaction mixture was maintained at a temperature of 20° C. by applying an ice bath to the outside of the 500 milliliter flask to remove the heat generated by the reaction of the metallic sodium and the propyl mercaptan. Thirty-two (32) grams (0.22 mole) of O-ethyl dimethylphosphoramido- chloridothioate were added over a period of 20 to 30 minutes to the reaction mixture contained in the 500 milliliter flask, while maintaining the reaction mixture at a temperature between 15 and 20° C. The reaction mixture was agitated and maintained at a temperature of 20–30° C. for a period of 2 hours after the addition of O-ethyl dimethylphosphoramidochloridothioate had been completed. The reaction mixture was removed from the 500 milliliter flask and filtered. The solid removed from the filtrate was discarded. The filtrate was placed under reduced pressure of approximately 20 millimeters of mercury absolute and the benzene removed by distillation using pot temperatures up to 70° C. The remaining high boiling portion of the reaction mixture was fractionally distilled under a pressure of .08 millimeter of mercury absolute. There was thus obtained O-methyl S-propyl dimethylphosphoramidodithioate which was found to be insoluble in water and 10 percent NaOH, but soluble in acetone, xylene and 95 percent ethanol.

In a manner similar to that of the foregoing examples, other O-alkyl S-substituted phosphoramidodithioates may be prepared of which the following are representative:

O-methyl S-benzyl dimethylphosphoramidodithioate,
O-methyl S-hexyl methylphosphoramidodithioate,
O-methyl S-hexyl methylphosphoramidodithioate,
O-ethyl S-(2-methylpentyl) methylphosphoramidodithioate,
O-methyl S-(2,2-dimethylbutyl) dimethylphosphoramidodithioate,
O-methyl S-heptyl methylphosphoramidodithioate,
O-methyl S-(3-ethylpentyl) dimethylphosphoamidodithioate,
O-ethyl S-(2,3-dimethylpentyl) dimethylphosphoramidodithioate,
O-methyl S-octyl dimethylphosphoramidodithioate,
O-methyl S-(2-ethylhexyl) dimethylphosphoramidodithioate,
O-methyl S-(2-ethyl 3 methyl pentyl) dimethylphosphoramidodithioate,
O-ethyl S-(3-hydroxypropyl) dimethylphosphoramidodithioate,
O-methyl S-(2-hydroxypropyl) methylphosphoramidodithioate,
O-ethyl S-(2-ethylbenzyl) methylphosphoramidodithioate,
O-methyl S-benzyl dimethylphosphoramidodithioate,
O-ethyl S-ethyl dimethylphosphoramidodithioate, etc.

The O-alkyl S-substituted phosphoramidodithioates of the present invention have been successfully employed as insecticides and parasiticides and are adapted to be employed for the control of a wide range of agricultural and household pests. They may be applied to growing vegetation in amounts required for insect control with negligible damage to plant foliage. For such parasiticidal use, the products may be dispersed on a finely divided solid and employed as dusts. Also, such mixtures may be dispersed in water with the aid of a wetting agent and the resulting aqueous suspensions employed as sprays. In other procedures, the new products may be employed in oils, as constituents of oil-in-water emulsions, or in water dispersions with or without the addition of emulsifying, wetting or dispersing agents. Suitable concentrations of the toxicants in dusts are in the order of from about 0.1 to 10 percent by weight of the dust, and in the liquid suspensions from about 0.10 to 2 pounds per 100 gallons of the spray mixture.

Aqueous dispersions of the compounds prepared in Examples I to XII, inclusive, have been tested at concentration of 1 pound per hundred gallons, by wetting the foliage of bean plants with the dispersion to be evaluated and then placing from 50 to 100 two-spotted spider mites (*Tetranychus bimaculatus*) on the wetted plants. After a period of six days had passed, the insects were examined and only dead two-spotted spider mites were found.

Various modifications may be made in the present invention without departing from the spirit or scope thereof, and it is to be understood that I limit myself only as defined in the appended claims.

I claim:
1. An O-alkyl S-substituted phosphoramidodithioate having the formula:

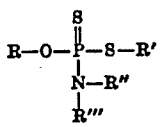

wherein R is a lower alkyl radical containing up to 4 carbon atoms, R' is selected from the group consisting of alkyl radicals containing up to 12 carbon atoms, benzyl radicals and hydroalkyl radicals containing from 2 to 8 carbon atoms, and R" and R'" are individually selected from the group consisting of hydrogen and lower alkyl radicals containing up to 4 carbon atoms.

2. An O-alkyl S-alkyl phosphoramidodithioate having the formula:

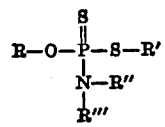

wherein R is a lower alkyl radical containing up to 4 carbon atoms, R' is an alkyl radical containing from 2 to 8 carbon atoms, R" is hydrogen and R'" is an alkyl radical containing up to 4 carbon atoms.

3. O-methyl S-propyl methylphosphoramidodithioate having the formula:

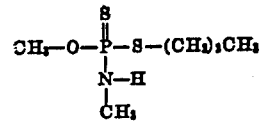

4. O-methyl S-tertiary butyl methylphosphorodithioate having the formula:

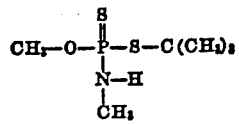

5. O-methyl S-sec-butyl methylphosphoramidodithioate having the formula:

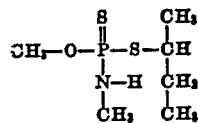

6. O-methyl S-benzyl methylphosphoramidodithioate having the formula:

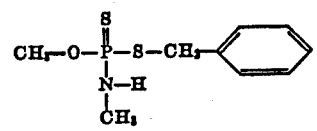

7. O-methyl S-octyl methyl phosphoramidodithioate having the formula:

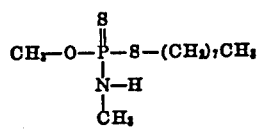

8. O-ethyl S-propyl methyl phosphoramidodithioate having the formula:

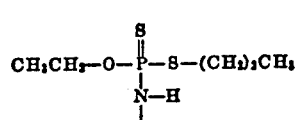

9. O-methyl S-(2-hydroxy ethyl) methylphosphoramidodithioate having the formula:

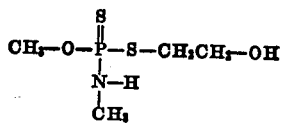

10. O-ethyl S-butyl methylphosphoramidodithioate having the formula:

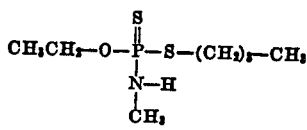

11. O-ethyl S-octyl methylphosphoramidodithioate having the formula:

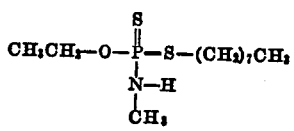

12. An O-alkyl S-substituted phosphoramidodithioate having the formula:

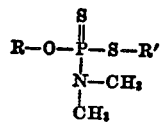

wherein R is a lower alkyl radical and R' is selected from the group consisting of alkyl radicals containing up to 12 carbon atoms.

References Cited in the file of this patent
UNITED STATES PATENTS

| | | |
|---|---|---|
| 2,852,469 | Hugel et al. | Sept. 16, 1958 |
| 2,881,201 | Schrader | Apr. 7, 1959 |
| 2,894,019 | Maeder | July 7, 1959 |
| 2,967,884 | Dunn et al. | Jan. 10, 1961 |
| 2,971,020 | Schrader | Feb. 7, 1961 |

UNITED STATES PATENT OFFICE
CERTIFICATE OF CORRECTION

Patent No. 3,072,702            January 8, 1963

Herman O. Senkbeil

It is hereby certified that error appears in the above numbered patent requiring correction and that the said Letters Patent should read as corrected below.

Column 2, line 5, for "hereafter" read -- thereafter --; column 3, line 15, for "81-" read -- 82- --; column 4, lines 5 to 9, the formula should appear as shown below instead of as in the patent:

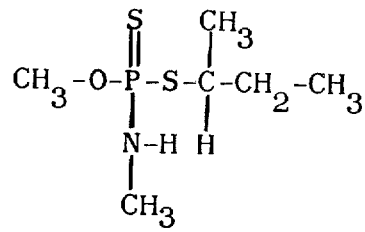

column 6, lines 28 and 29, for "Methylphosphoramidothioate" read -- Methylphosphoramidodithioate --.

Signed and sealed this 4th day of February 1964.

(SEAL)
Attest:
ERNEST W. SWIDER            EDWIN L. REYNOLDS

Attesting Officer            Acting Commissioner of Patents